Aug. 19, 1969    T. A. MILLER, JR    3,461,876
TUBING CLAMP

Filed Sept. 26, 1966    2 Sheets-Sheet 1

INVENTOR.
THEODORE A. MILLER JR.
BY Oldham & Oldham
ATTYS.

Aug. 19, 1969  T. A. MILLER, JR  3,461,876
TUBING CLAMP

Filed Sept. 26, 1966  2 Sheets-Sheet 2

INVENTOR.
THEODORE A. MILLER JR.
BY
Oldham & Oldham
ATTYS.

United States Patent Office 3,461,876
Patented Aug. 19, 1969

3,461,876
TUBING CLAMP
Theodore A. Miller, Jr., Ashland, Ohio, assignor to Abbott Laboratories, North Chicago, Ill., a corporation of Illinois
Filed Sept. 26, 1966, Ser. No. 581,930
Int. Cl. A61b *17/02, 17/06, 17/08*
U.S. Cl. 128—346                        6 Claims

ABSTRACT OF THE DISCLOSURE

A clamp comprising a generally W-shaped member is provided and is formed from resilient plastic material. One end of each of the outside legs of the W is connected by the integral hinge forming inside legs of the member. The free ends of the outside legs carry means for locking the ends together in a clamping position. Each outside leg is of substantially T-shape in cross section and has an integral flange portion extending inwardly of the W towards the flange portion of the other outside leg.

---

This invention relates to a tubing clamp, and, to a device which may be used for surgical use such as an umbilical cord clamp, or in other related areas where the same type of clamping action is desired.

There have been many kinds and types of clamps heretofore designed which have been for the purpose of clamping tubing, the umbilical cord, or the like. These devices have not always proved satisfactory, however, since they have either been too expensive, too cumbersome, have not had sufficient clamping force, or have been too difficult to be effectively applied with the use of only one hand.

It is the main object of the present invention to overcome the stated and other prior art objections by providing a new, improved tubing clamp which is inexpensive to produce, easily appliable with one hand, and provides sufficient clamping force with no chance of accidental displacement so that it effectively and properly does the intended job.

Basically, the invention consists of a surgical hose clamp comprising a generally W-shaped member formed from a flexible resilient plastic, one end of each of the outside legs of the W being connected by an integral hinge forming inside leg of the member, the other ends of the outside legs being normally spaced apart but carrying means for locking the free or other ends together in a clamping position, each outside leg being substantially T-shaped in cross section and having an integral flange portion extending inwardly of the W toward the flange portion of the other leg wherein when the free ends of the outer legs are clamped together the outside legs move toward each other and a hose or the like can be compressed between and held by the integral flange portions.

For a better understanding of the invention, reference should be had to the following drawings wherein.

Figure 1:
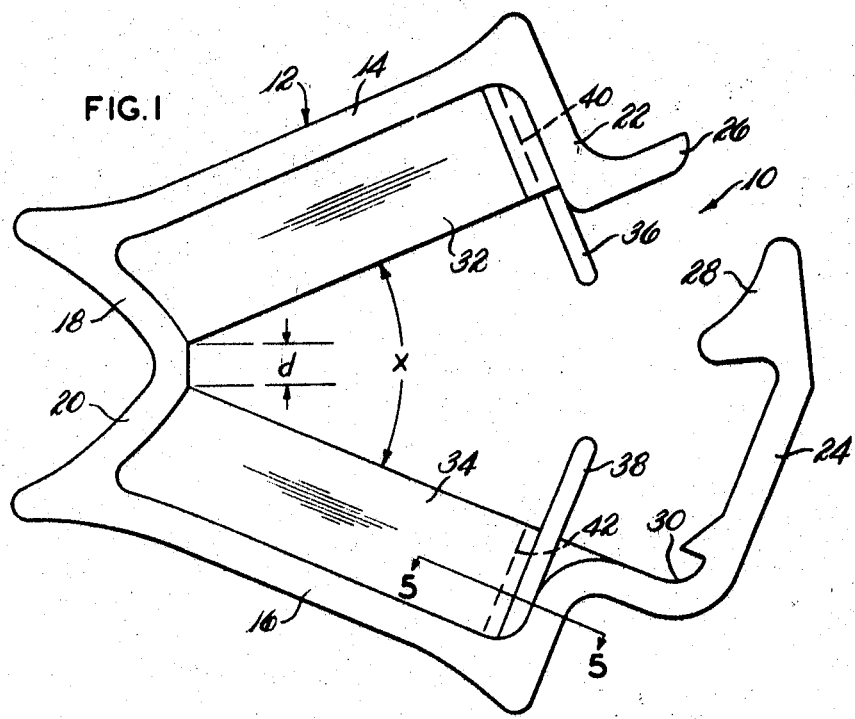
FIG. 1 is an enlarged side elevation of the tubing clamp of the invention, particularly illustrating the clamp in a molded or normal, spaced apart position.

Referring to the drawings, the tubing clamp of the invention is generally indicated by the numeral 10. The clamp 10 is comprised of a generally W-shaped member 12 which is formed from a durable, flexible, resilient plastic such as polypropylene. The two outside legs 14 and 16 of the W-shaped member 12 are connected by the shorter inside legs 18 and 20 of member 12, these inside legs effecting a hinge connection of outside legs 14 and 16 whereby they can be squeezed together.

Figure 2:
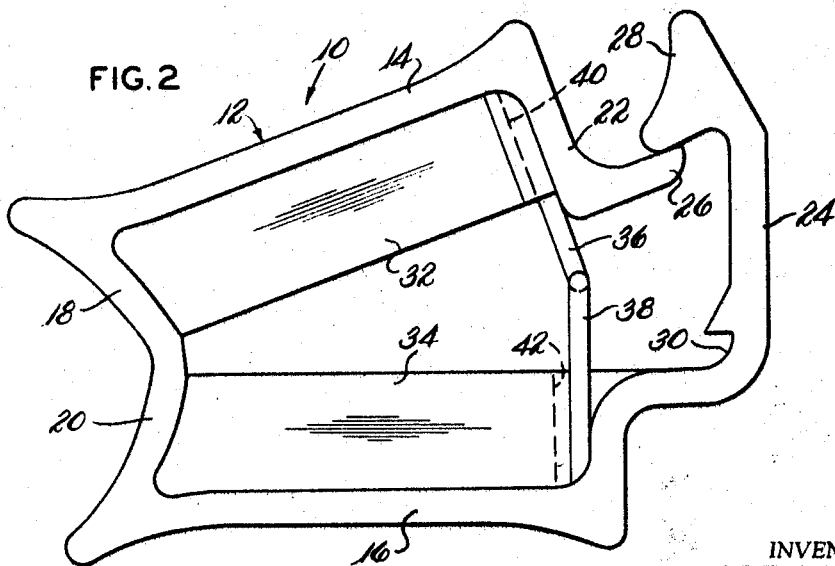
FIG. 2 is an enlarged side elevation similar to FIG. 1, particularly illustrating the clamp in an interlocked but still open position.

The other or free ends of outside legs 14 and 16, as is illustrated by FIG. 1, are normally biased apart by the resilient spring action effected by the integral hinge forming legs 18 and 20. Extending from the other or outer ends of outside legs 14 and 16 are integral footer members 22 and 24 which are adapted to adjustably interlock with each other in at least two different positions in order to clamp together the outside legs 14 and 16. FIG. 2 illustrates the two footer members 22 and 24 interlocking whereby a shoulder or finger 26 of footer 22 merely catches on a shoulder 28 of footer 24. Such a locking action of the two footer members is easily accomplished by merely squeezing the two outside legs 14 and 16 together until the two shoulders 26 and 28 catch and engage with each otther.

In order to obtain a fully clamped or shut position of the clamp 10 of the invention, the two outside legs 14 and 16 are merely squeezed further together whereby shoulder 26 of footer 22 will slide down and catch in groove 30 provided in footer member 24 by a shoulder on projection thereon. Of course, such squeezing action in order to obtain interlocking of the footer members 22 and 24 is easily obtained by merely placing a thumb on one outside leg of member 12 and an index finger on the other outside leg and then squeezing together. Thus, the clamp of the invention can be easily applied with only one hand.

Figure 3:
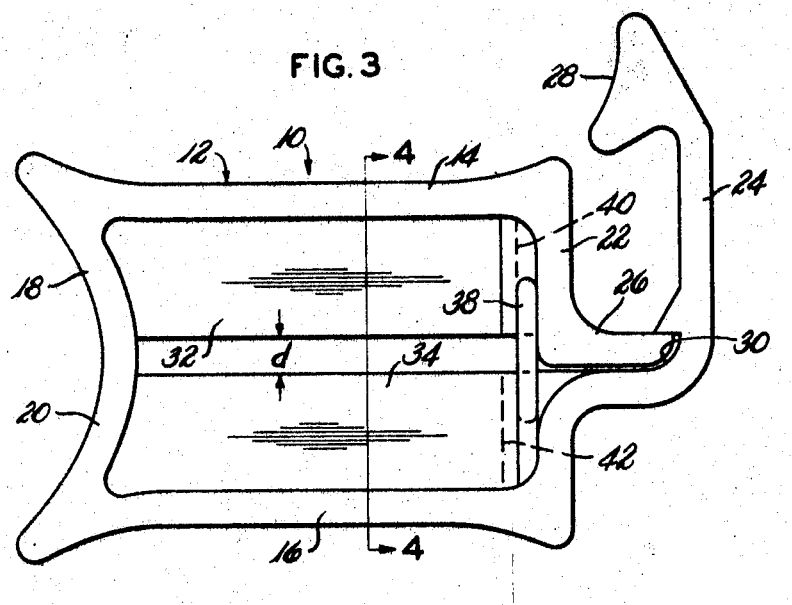
FIG. 3 is an enlarged side elevation similar to FIGS. 1 and 2, particularly illustrating the clamp in a fully closed or shut position.
Figure 4:
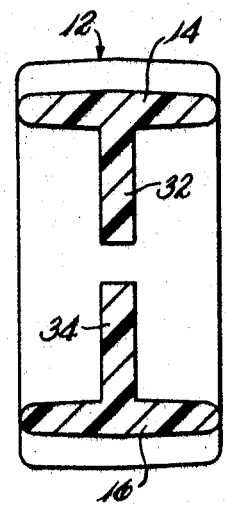
FIG. 4 is a cross sectional view taken substantially along line 4—4 of FIG. 3.
Figure 5:
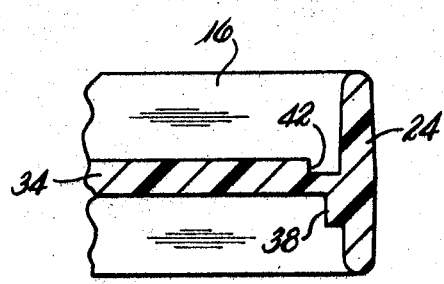
FIG. 5 is a fragmentary cross sectional view taken substantially along line 5—5 of FIG. 1.

As is best illustrated by FIG. 4, both outside legs 14 and 16 of member 12 are substantially T-shaped in cross section and have integral flange portions 32 and 34 respectively which extend inwardly of member 12 toward each other. As is best illustrated by FIG. 1, when outside legs 14 and 16 are in their molded spaced apart position, integral flange portions 32 and 34 extending therefrom form an angle X therebetween of about 30 to 45°. When, however, the clamp 10 is in fully shut position, as indicated by FIG. 3, the integral flange portions 32 and 34 are parallel to each other but still a distance *d* separates the downwardly extending edges thereof. Normally, the distance *d* will be about .070 inch so that effective clamping action of a tube, an umbilical cord, or the like can be obtained.

In order to insure that the outside legs 14 and 16 of member 12 are squeezed together in proper clamping position, a pair of integral pins 36 and 38 are associated with footer members 22 and 24 respectively. The pins 38 and 36 extend inwardly toward each other and are adapted to be slidably received in slots or grooves 40 and 42 which are formed respectively in integral flange portions 32 and 34 when the clamp 10 is locked to a fully shut position, as indicated by FIG. 3. Such pins 36 and 38 prevent lateral distortion of the legs 14 and 16 when operatively positioned, and insure that integral flange members 32 and 34 will be properly aligned as the clamp is shut to insure proper clamping action.

From the foregoing, it is submitted that a novel improved low cost clamp has been provided by the unitary molded article of the invention so that the objects thereof are achieved.

What is claimed is:
1. A clamp comprising a generally W-shaped member formed from a flexible resilient plastic, one end of each of the outside legs of the W being connected by the in- tegral hinge forming inside legs in the member, the other ends of the outside legs being normally spaced apart but carrying means for locking such other ends together in a clamping position, each outside leg being substantially T-shaped in cross section for the length thereof and having an integral flange portion extending inwardly of the W toward the flange portion of the other outside leg so that when the free ends of the outside legs are clamped together, the outside legs have been moved toward each other and a hose or the like can be compressed between and held by the integral flange portions which are positioned with adjacent edges in substantially parallel spaced relation.

2. The combination according to claim 1 wherein when said outside legs are in their normal spaced apart open position the integral flanges portions extending from each leg are inclined to each other at an angle of about 30 to 45° but wherein when said outside legs are fully clamped together in a shut position the downwardly extending edges of the integral flange portions are parallel to but are still spaced apart from each other.

3. The combination according to claim 1 wherein the means carried by the free ends of the outside legs for locking the ends together comprise interlocking integral footer members with shoulders thereon extending from said free ends towards the other outside leg, one of said footer members being longer than the other, said longer footer member having a recess formed by a second shoulder thereon for engaging a shoulder on the shorter leg, said footer members adjustably interlocking with each other in two different positions to clamp together the outside legs in partially closed and in closed positions.

4. The combination according to claim 3 and including a member associated with each of said flange portions and extending inwardly toward each other from the other ends of said outside legs on opposite sides of said flange portions, each of said pins being received in a groove in the opposite one of said integral flange portions when the free ends of said outside legs are clamped together.

5. A clamp as in claim 1 where said inside legs are each of substantially the same effective width in the clamp as one of said flange portions.

6. A clamp comprising a generally W-shaped member formed from a flexible resilient plastic, one end of each of the outside legs of the W being connected by the integral hinge forming inside legs in the member, the free ends of the outside legs being normally spaced apart but carrying means including interlocking footer means for locking such other ends together in a clamping position, each outside leg being substantially T-shaped in cross section and having an integral flange portion extending inwardly of the W toward the flange portion of the other outside leg so that when the free ends of the outside legs are clamped together, the outside legs are moved toward each other and a hose or the like can be compressed between and held by the integral flange portions, and pin members associated with said footer means and extending inwardly toward each other from the free ends of said outside legs, said pins being received in grooves in said integral flange portions when the free ends of said outside legs are clamped together.

References Cited

UNITED STATES PATENTS

| | | | |
|---|---|---|---|
| 788,603 | 5/1905 | Rowell | 251—9 |
| 2,108,325 | 2/1938 | Ziegler | 128—346 |
| 3,204,636 | 9/1965 | Kariher | 128—346 |
| 3,323,208 | 6/1967 | Hurley | 128—346 X |
| 3,367,336 | 2/1968 | Eizenberg | 128—321 |

FOREIGN PATENTS 84,392  10/1957  Denmark.

DALTON L. TRULUCK, Primary Examiner

U.S. Cl. X.R.

24—248; 251—10